United States Patent
Gazzola et al.

(10) Patent No.: US 8,452,179 B2
(45) Date of Patent: May 28, 2013

(54) REMOTELY SETTABLE CHROMATIC DISPERSION ROBUSTNESS FOR DENSE WAVE DIVISION MULTIPLEXING INTERFACES

(75) Inventors: Maurizio Gazzola, Milan (IT);
Giacomo Losio, Tortona (IT);
Alessandro Sguazzotti, Caponago (IT);
Andrea Castoldi, Monza (IT)

(73) Assignee: Cisco Technology, Inc., San Jose, CA (US)

( * ) Notice: Subject to any disclaimer, the term of this patent is extended or adjusted under 35 U.S.C. 154(b) by 573 days.

(21) Appl. No.: 12/713,913

(22) Filed: Feb. 26, 2010

(65) Prior Publication Data
US 2011/0211840 A1    Sep. 1, 2011

(51) Int. Cl.
*H04B 10/18*    (2006.01)
*H04B 10/2513*    (2006.01)

(52) U.S. Cl.
CPC ............................... *H04B 10/25133* (2013.01)
USPC .......................................... 398/81; 398/147

(58) Field of Classification Search
USPC .................................................. 398/81, 147
See application file for complete search history.

(56) References Cited

U.S. PATENT DOCUMENTS

| | | | |
|---|---|---|---|
| 3,697,757 A * | 10/1972 | Stone | 398/32 |
| 5,150,248 A * | 9/1992 | Alfano et al. | 398/147 |
| 5,224,194 A * | 6/1993 | Islam | 385/122 |
| 5,701,188 A | 12/1997 | Shigematsu et al. | |
| 5,991,471 A | 11/1999 | Yu | |
| 6,091,535 A | 7/2000 | Satoh | |
| 6,128,118 A * | 10/2000 | Marcenac | 398/147 |
| 6,519,065 B1 | 2/2003 | Colbourne et al. | |
| 6,607,313 B1 * | 8/2003 | Farries et al. | 398/102 |
| 6,650,458 B1 | 11/2003 | Prosyk et al. | |
| 6,819,872 B2 * | 11/2004 | Farries et al. | 398/102 |
| 6,934,069 B2 | 8/2005 | Moon et al. | |
| 7,082,268 B2 * | 7/2006 | Schemmann et al. | 398/158 |
| 7,116,874 B2 * | 10/2006 | Brown et al. | 385/122 |
| 7,171,089 B2 * | 1/2007 | Feder et al. | 385/122 |
| 7,359,645 B2 * | 4/2008 | Miyashita et al. | 398/147 |
| 7,542,677 B2 * | 6/2009 | Sekiya et al. | 398/81 |
| 7,565,037 B2 * | 7/2009 | Popescu et al. | 385/1 |
| 7,636,524 B2 * | 12/2009 | Dorring et al. | 398/159 |
| 7,706,697 B2 * | 4/2010 | Cuenot | 398/208 |
| 7,747,175 B2 * | 6/2010 | Hirooka et al. | 398/188 |
| 2001/0021053 A1 | 9/2001 | Colbourne et al. | |
| 2002/0167703 A1 | 11/2002 | Merritt | |
| 2003/0081277 A1 * | 5/2003 | Corbeil et al. | 359/110 |
| 2003/0190107 A1 | 10/2003 | Walker | |

* cited by examiner

*Primary Examiner* — Danny Leung

(57) ABSTRACT

An apparatus-transmitting signals in a network includes a light source generating an optical signal for encoding information transmitted over a light path of the network, a modulator controlling the optical signal to generate chirped optical pulses having a first frequency spectrum such that when the pulses are transmitted from the apparatus and received at an end of the first light path the pulses have a chromatic dispersion penalty that is less than a predetermined penalty. Modulation control circuitry receives instructions from a remote controller and, in response to the instructions, controls the modulator such that the chirped optical pulses have a second frequency spectrum such that when the pulses are transmitted from the apparatus and received at an end of a second light path of the telecommunications network the pulses have a chromatic dispersion penalty that is less than a predetermined penalty.

20 Claims, 4 Drawing Sheets

200

REMOTELY SETTABLE CHROMATIC DISPERSION ROBUSTNESS FOR DENSE WAVE DIVISION MULTIPLEXING INTERFACES

TECHNICAL FIELD

The present disclosure relates generally to telecommunication and in particular to remotely settable chromatic dispersion robustness for dense wave division multiplexing interfaces.

BACKGROUND

Telecommunications technology can use optical signals to communicate information from one location to another. In particular, optical signals can be communicated over optical fibers that connect one location to another. For example, a telecommunications network may include many nodes, and optical signals can be sent from beginning nodes to ending nodes along light paths through the transmission network. The light paths may include several intermediate nodes between the beginning node and the ending node of a light path.

One particular technology used in optical communications technology is dense wavelength division multiplexing (DWDM), which permits the concurrent transmission of multiple information channels over a common optical fiber, thus expanding available bandwidth of information that can be transmitted over the fiber. Optimally exploiting the capabilities of optical communication, including DWDM technology, requires dealing with various transmission impairments. In particular, attenuation and chromatic dispersion of optical signals occur as the signals propagate through a length of optical fiber. Eventually, after optical signals have propagated over a long distance through an optical fiber and have suffered a certain amount of attenuation and/or chromatic dispersion, the signals must be amplified and/or regenerated so that the information carried by the optical signals can continue to propagate through the fiber.

Erbium-doped fiber amplifiers (EDFAs) can be used to amplify an optical signal having a wavelengths of about 1525-1565 nanometers (nm), which propagates in an optical fiber. Because an EDFA provides gain over a relatively wide of wavelengths, an EDFA can provide simultaneous amplification of all wavelengths in a composite DWDM signal. Using this type of amplification, the DWDM composite signal may be transmitted large distances, e.g., more than 600 km, without regeneration.

Another type of optical communication impairment is chromatic dispersion, which leads to a widening of an optical pulse as the pulse propagates along the fiber and is caused by different spectral components of the pulse propagating through the fiber at different velocities. Because of chromatic dispersion, the modulation of optical pulses that encode data spread out in the time domain as the pulses propagate along the fiber and can start to overlap one another, which can lead to bit errors. Generally, the amount of chromatic dispersion suffered by an optical signal depends on the characteristics of the fiber and the length of the fiber span over which the signal propagates.

The amount of chromatic dispersion suffered by an optical signal that travels over a fixed length of optical fiber can be compensated by inserting a dispersion compensation unit (DCU) into the transmission path. The dispersion compensation unit deliberately introduces a chromatic dispersion that is opposite in sign to the dispersion caused by transmission of the signal through the fiber and therefore effectively cancels out the dispersion caused by the optical fiber. In order to tune the dispersion compensation unit to provide a negative amount of chromatic dispersion equal in magnitude to the positive dispersion caused by transmission through the optical fiber the amount of dispersion accrued while the signal propagates through the optical fiber must be known. However, although a DCU may provide the proper amount of dispersion compensation for a first light path that passes through the DCU, the chromatic dispersion characteristics of another light path that passes through the DCU may be adversely affected by the compensatory chromatic dispersion introduced by the DCU. Additionally, if the network is reconfigured so that the length of the first path changes or if the amount of chromatic dispersion in the first light path changes, then the compensatory chromatic dispersion introduced by the DCU may no longer be appropriate for the first path either.

DESCRIPTION OF EXAMPLE EMBODIMENTS

Overview

Figure 1:
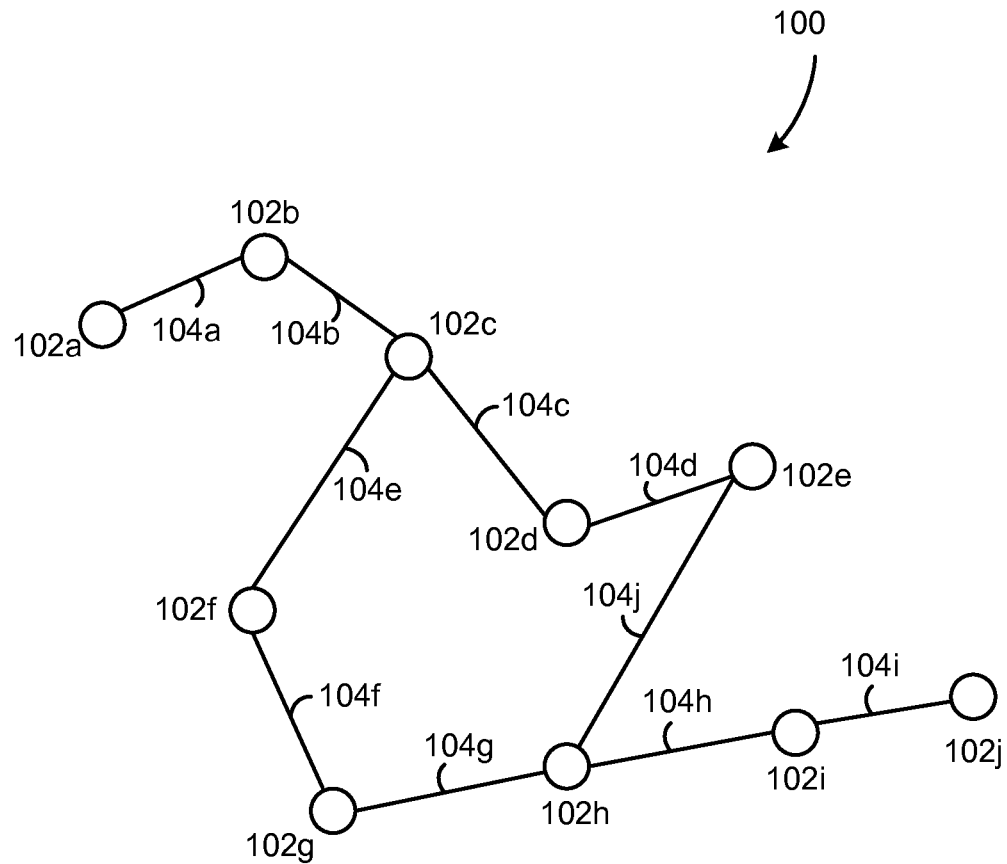
FIG. 1 is a schematic block diagram of a telecommunications network that includes a plurality of nodes.

According to an example embodiment, an apparatus for transmitting signals in a telecommunications network includes a light source, a modulator, and modulation control circuitry. The light source is configured for generating an optical signal for encoding information transmitted from the apparatus over one or more light paths of the telecommunications network. The modulator is operably coupled to the light source and is configured for controlling the optical signal to generate chirped optical pulses of the optical signal. The chirped optical pulses have a first frequency spectrum controlled by the modulator, such that when the pulses are transmitted from the apparatus and received at an end of the first light path the pulses have a chromatic dispersion penalty that is less than a predetermined penalty. The modulation control circuitry is configured for receiving instructions from a remote controller and, in response to the instructions, controlling the modulator such that the chirped optical pulses have a second frequency spectrum controlled by the modulator, so that when the pulses are transmitted from the apparatus and received at an end of a second light path of the telecommunications network the pulses have a chromatic dispersion penalty that is less than a predetermined penalty.

According to another example embodiment, a system includes a tunable chirped wavelength division multiplexed transmitter (TCWDM), and a central office controller. The TCWDM includes a light source, a modulator, and modulation control circuitry. The light source is configured for generating an optical signal for encoding information transmitted from the TCWDM over one or more light paths of a telecommunications network. The modulator is operably coupled to the light source and is configured for controlling the optical signal to generate chirped optical pulses of the optical signal. The chirped optical pulses have a first frequency spectrum controlled by the modulator, such that when the pulses are transmitted from the TCWDM and received at an end of the first light path the pulses have a chromatic dispersion penalty that is less than a predetermined penalty. The modulation control circuitry is configured for controlling the modulator in response to received instructions, such that the chirped optical pulses have a second frequency spectrum controlled by the modulator and when the pulses are transmitted from the TCWDM and received at an end of a second light path of the telecommunications network the pulses have a chromatic dispersion penalty that is less than a predetermined penalty. The central office controller is located remotely from the TCWDM, and the central office controller includes a network configuration evaluation module and a TCWDM control module. The a network configuration evaluation module is configured for evaluating a change in a configuration of the telecommunications network as a result of the pulses being transmitted from the TCWDM and received at the end of the second light path rather than transmitted from the TCWDM and received at the end of the first light path. The TCWDM control module is configured for generating the instructions based on the change in the configuration of the telecommunications network and configured for sending the instructions to the TCWDM.

According to another example embodiment, an optical signal for encoding information transmitted from a tunable chirped wavelength division multiplexed transmitter (TCWDM) over one or more light paths of a telecommunications network is generated. An optical signal that encodes information transmitted over one or more light paths in a telecommunications network is modulated. The modulated optical signal is controlled to generate chirped optical pulses of the optical signal, where the chirped optical pulses have a first frequency spectrum, such that when the pulses are received at an end of a first light path of the telecommunications network the pulses have a chromatic dispersion penalty that is less than a predetermined penalty. A change in a configuration of the telecommunications network is evaluated as a result of the optical signal received at an end of a second light path of the telecommunications network rather at the end of the first light path. Then, the modulated optical signal is remotely controlled, from a distance of more than one kilometer, such that the chirped optical pulses have a second frequency spectrum and when the pulses are received at the end of a second light path of the telecommunications network the pulses have a chromatic dispersion penalty that is less than a predetermined penalty.

Description

FIG. 1 is a schematic block diagram of a telecommunications network that includes a plurality of nodes. The network 100 can include a plurality of nodes 102a, 102b, 102c, 102d, 102e, 102f, 102g, 102h, 102i, and 102j that can be coupled by a number of optical links 104a, 104b, 104c, 104d, 104e, 104f, 104g, 104h, and 104i to form one or more light paths between nodes to transmit information between the nodes. For example, a first light path between nodes 102a and 102e can include the optical links 104a, 104b, 104c, and 104d to define a light patch that carries information from nodes 102a to node 102e over intermediate links 102b, 102c, and 102d. A second light path between nodes 102a and 102e can include the optical links 104a, 104b, 104e, 104f, 104g, and 104j to define a light patch that carries information from nodes 102a to node 102e over intermediate links 102b, 102c, 102f, 102g, and 102h. A third light path between nodes 102a and 102j can include the optical links 104a, 104b, 104e, 104f, 104g, 104h, and 104i to define a light patch that carries information from nodes 102a to node 102j over intermediate links 102b, 102c, 102f, 102g, 102h, and 102i.

The optical links 104a, 104b, 104c, 104d, 104e, 104f, 104g, 104h, and 104i can include optical fiber segments that carry signals between nodes. The optical links can be several kilometers, tens of kilometers or hundreds of kilometers long. The optical fibers used in the optical links can have material and performance characteristics that are optimized for carrying optical signals over long distances. For example, the optical fiber segment 102 can have a minimum attenuation as a function of wavelength for optical signals having a wavelength of about 1550 nm, and therefore optical data signals having a wavelength of about 1550 nm may be used to send long haul data communications over the optical links. A laser located at the node 102a can generate optical signals in the form of a series of optical pulses to digitally encode information and can launch the signals in to the network for transmission to one or more other nodes of the network.

The different light paths may induce different amounts of chromatic dispersion in signals transmitted from a beginning node (e.g., node 102a) to an end node (e.g., node 102e or node 102j), where the different amounts of chromatic dispersion may be induced by different lengths of the light paths or by physical properties of optical fibers used in the links along a path, or in the presence of different optical elements (e.g., DCU's in the different paths). The chromatic dispersion caused by transmission over a light path from a beginning node to an end node may cause a penalty in the quality of the signal received at the end node. For example, the optical signal to noise (OSNR) penalty suffered in the received signal due to an uncompensated chromatic dispersion residual may be expressed as:

$$\text{pen}=k^{*}(D_{res}-0)^{2} \qquad (1)$$

where "pen" is the OSNR penalty and is measured in dB; $D_{res}$ is the uncompensated chromatic dispersion residual and is measured in ps/nm; and k is coefficient that depends on the light path over which the signals are transmitted and is measured in nm/ps.

Various techniques can be used to address the chromatic dispersion (CD) experienced by signals that traverse a light path. In one implementation, a DCU can be inserted into one of the links of the light path to provide compensatory chromatic dispersion that induces a penalty having an equal magnitude but an opposite sign to the penalty of equation (1), such that the link-induced CD is canceled by the DCU-induced CD. In another implementation, optical pulses of the signal that is transmitted from the beginning node 102a can be "chirped" to compensate for the chromatic dispersion that is introduced by transmission through the light path. A chirped pulse is a pulse in which the carrier frequency of the pulse changes over time. In an "up-chirped" pulse the instantaneous carrier frequency of the pulse increases with time, and in a "down-chirped" pulse the instantaneous frequency decreases with time.

Figure 2:
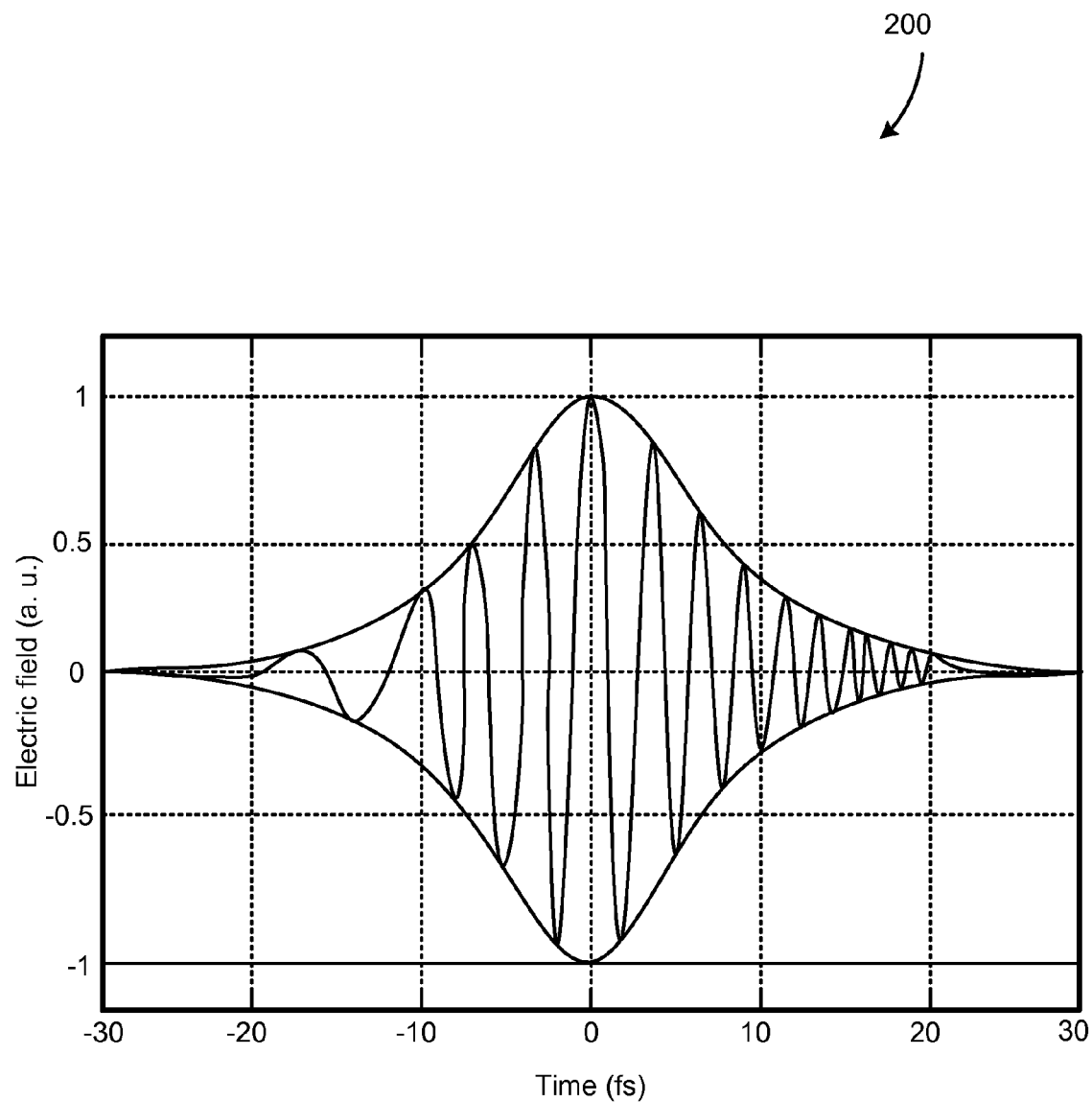
FIG. 2 shows the time-dependent electric field of an up-chirped pulse.

FIG. 2 shows the time-dependent electric field of an up-chirped pulse. Thus, rather than having a single carrier frequency, the chirped pulses includes a spectrum of frequencies, which propagate at different velocities through the light path from the beginning node to the end node. Of course, any amplitude modulated pulse includes a spectrum of more than one frequency. However, in "chirped pulses," as used in this document, it is the instantaneous frequency of the pulse that changes over time.

In one particular example, the temporal dependence of the frequency of a linearly-chirped electric field can be written as:

$$\omega(t) = \omega_0 + \frac{d\omega}{dt}t = \omega_0 + bt. \quad (2)$$

Then, the time-dependent electric field of a pulse having a Gaussian amplitude envelope and the frequency chirp given by equation (2) can be written as:

$$E(t) = E_0 e^{-at^2} e^{-i\omega(t)t} = E_0 e^{-(a+ib)t^2 - i\omega_0 t}. \quad (3)$$

The frequency spectrum, $\tilde{E}(\omega)$, of such a pulse can be determined by taking the Fourier transform, $$\tilde{f}(\omega) = \frac{1}{\sqrt{2\pi}} \int_{-\infty}^{+\infty} f(t) e^{i\omega t} dt, \quad (4)$$

of the above time-dependent electric field and plugging in equation (3) for f(t) in equation (4) to yield:

$$\tilde{E}(\omega) = \frac{1}{\sqrt{2\pi}} \int_{-\infty}^{+\infty} E_0 e^{-(a+ib)t^2 - i\omega_0 t} e^{i\omega t} dt. \quad (5)$$

The integral of equation (5) can be solved to yield:

$$\tilde{E}(\omega) = \frac{E_0}{\sqrt{2}\sqrt{a+ib}} e^{\frac{-(\omega-\omega_0)^2}{4(a+ib)}}, \quad (5)$$

and then the spectral intensity of the pulse having the Gaussian amplitude envelope and the time-dependent frequency given by equation (2) is given by:

$$I(\omega) = \tilde{E}(\omega)\tilde{E}^*(\omega) = \frac{E_0}{\sqrt{2}\sqrt{a^2+b^2}} e^{\frac{-a(\omega-\omega_0)^2}{2(a^2+b^2)}}. \quad (6)$$

Of course, other time-dependent chirps of the frequency besides that given by equation (2) and other amplitude envelopes other than a Gaussian envelope are also possible. By appropriately choosing the frequency spectrum and the temporal pulse envelope of the electric field amplitude of a chirped pulse that is used to carry signals through a light path the effect of chromatic dispersion caused propagation through the light path can be mitigated by the time the pulse arrives at the end node of the light path. For example, if a light path provides a chromatic dispersion that delays lower frequencies more than higher frequencies, then the up-chirped pulse shown in FIG. 2 may be launched into light path from a first node and by the time the pulse arrives at a second node at the end of the light path, the lower frequencies in the pulse's spectrum may have been delayed by an amount relative to the higher frequencies, such that all the frequency components of the chirped pulse arrive at the end of the light path at substantially the same time.

The introduction of a chirped frequency spectrum in the pulses of the optical signal leads to a modified express of the OSNR penalty, which may be written as:

$$\text{pen}Q = k1*(D_{res} - D_{chirp})^2 + k2*(D_{res} - 0)^2 \quad (7)$$

where k1 and k2 and interface specific coefficients measure in ps/nm; $D_{chirp}$ is a chirp dependent parameter measured in ps/nm. In this case the minimum penalty takes place when $D_{res} = k1*D_{chirp}/(k1+k2)$. Usually k1 is much larger than k2, so $D_{res}$ is approximately equal to $D_{chirp}$.

Of course, for different path lengths or for different physical properties of a path may induce different amounts of chromatic dispersion, and therefore different frequency spectra and pulse envelopes may be required of the chirped pulse to mitigate the effects of the different amounts of chromatic dispersion.

The network 100 may be configured at one time to convey information from node 102a to node 102e over the first light path, and then may be reconfigured to convey information from node 102a to node 102e over the second light path (e.g., due to a malfunction in node 102d that causes the first light path to become inoperative). Similarly, the network 100 may be configured at one time to convey information from node 102a to node 102e over the first light path, and then might be reconfigured to convey information from node 102a to node 102j over the third light path (e.g., due to a choice to use node 102a to send signals to node 102j rather than to node 102e)). In another implementation, network 100 may be configured at one time to convey information from node 102a to node 102e over the first light path, and then might be reconfigured to convey information from node 102a to node 102e over a modified version of the first light path, where the modification includes the use of different optical links or fibers having different CD properties than those used in the original version of the first optical path or due to the insertion or deletion of optical elements (e.g., a DCU) in the first optical path. Each of the aforementioned reconfigurations of the network may lead to different CD characteristics of the light path used in the original and reconfigured versions of the network 100. As described in more detail below, a transmitter of the beginning node can be tuned to appropriately control the frequency spectrum and the pulse envelope of chirped pulses transmitted from the beginning node to compensate for the changing amounts of chromatic dispersion caused by reconfiguration of the network 100.

Figure 3:
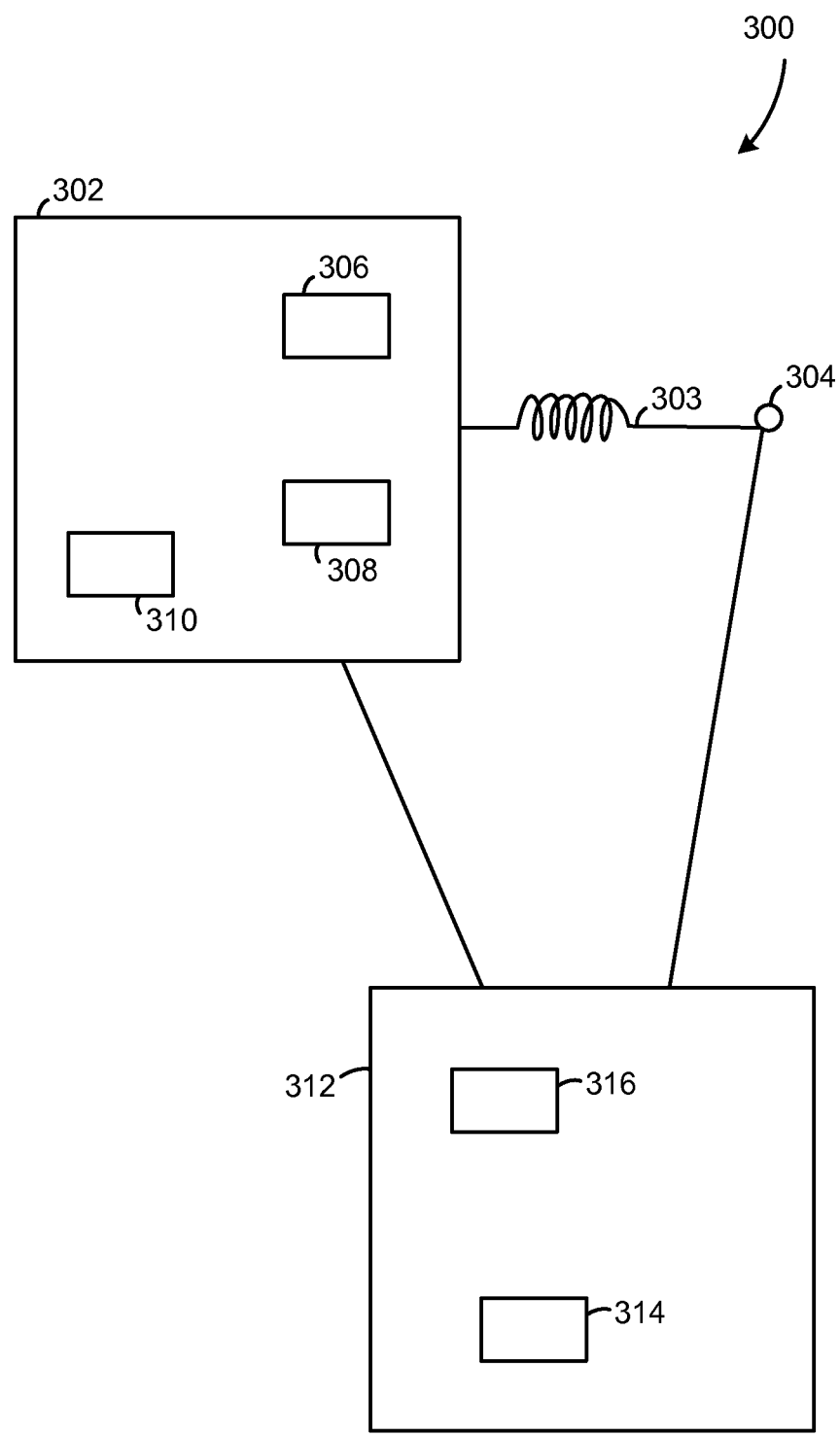
FIG. 3 is a schematic block diagram of a system having a remotely-controllable tunable chirped wavelength division multiplexed (TCWDM) transmitter for transmitting optical signals over a reconfigurable telecommunications network.

FIG. 3 is a schematic block diagram of a system 300 having a remotely-controllable tunable chirped wavelength division multiplexed (TCWDM) transmitter for transmitting optical signals over a reconfigurable telecommunications network. The system 300 includes a beginning network node 302 from which optical signals are sent over a light path in the network on a receiving or end node 304. The beginning network node 302 includes a light source 306 (e.g., a laser providing multiple WDM signals) that can generate an optical signal for encoding information for transmission over one or more light paths. The light source can generate different wavelengths for carrying different signals on different wavelength channels or may generate just one signal. The optical signals generated by the light source 306 are used to encode information for transmission over one or more light paths (which can include an optical fiber 303) in the network from the node 302 to the end node 304. The optical signal can be modulated by a modulator 308 that is coupled to the light source 306 and that is configured to control the optical signal to generate chirped optical pulses of the optical signal. The chirped pulses have a frequency spectrum that is controlled by the modulator 308, so that when the chirped pulses are transmitted from the beginning node 302 and received at the end node 304 the pulses have an OSNR penalty that is less than a predetermined penalty. The modulator 308 can either be internal to the light source 306 and module the light output from the light source, or the modulator 308 can be external to the light source 306 and can operate to receive an optical signal from the light source and to output a modulated version of the received signal.

The beginning node 302 also can include modulation control circuitry 310 this is configured for receiving instructions from a remote controller 312 to adjust the frequency spectrum of the chirped optical pulses to have a second frequency spectrum, so that when the pulses are transmitted from the beginning node 302 and received at the end node 304 over a reconfigured version of the network the pulses have an OSNR penalty that is also less than a predetermined penalty. Adjusting the frequency spectrum of the chirped pulses may be used to maintain the OSNR penalty below the predetermined threshold after a network reconfiguration that changes the chromatic dispersion experienced by pulses that are transmitted from a beginning node to an end node or to another end node.

The modulation control circuitry 310 can receive its instructions from the remote controller 312, e.g., a controller at a central office that monitors and maintains system performance of the network. The remote controller 312 can include an evaluation module 314 that is configured for evaluating a change in a reconfiguration of the telecommunications network, such that the pulses are sent along a different light path in the network. The reconfiguration can be due to the pulses being sent to a different end node, or the reconfiguration can be due to a change in the link between the same beginning and end nodes—for example, an optical element may be inserted in link between the nodes, or the distance traveled by a pulse transmitted from the beginning node to the end node change, or the dispersion properties of the link(s) between the beginning and end nodes may change, thus causing a reconfiguration of the network. The remote controller, which can be more than 1 kilometer from the transmitting node 302, also can include a control module 316 that is configured for generating the instructions that are sent to the node 302 for frequency spectrum of the chirped pulses. The instructions are based on the change in the network configuration that is evaluated by the evaluation module 314.

In one implementation, the instructions are based on a determination of the length of the second path and how it is different from the length of the first path. For example, the path lengths of the first and second light paths can be determined, either from known design details of the network or empirically by measuring the length of the optical path between the beginning node and the end node. Then, the difference in the lengths of the first and second paths can be used to generate the instructions that are sent to the modulation control circuitry for controlling the frequency spectrum of the chirped pulses. For example, if the length of the first path is 25 km and the length of the second path is 50 km and if the chromatic dispersion in both the first and second paths is approximately 16 ps/nm/km, then the instructions generated by the control module may instruct the node 302 to adjust the spectrum of the chirped pulse to account for the additional 16 ps/nm of chromatic dispersion due to the reconfiguration of the network.

In another implementation, the instructions may be based on a determined chromatic dispersion penalty of the pulses that are received at the end node of the second light paths. For example, the second node may include detection circuitry configured for determining an amount of chromatic dispersion of the received pulses or a spectrum of the received pulse, and based on the determined CD or spectrum the instructions can be generated for sending to the node 302 to maintain a chromatic dispersion performance characteristic of the chirped pulses by controlling the spectrum of the chirped pulses. Similarly, the instructions may be based on a determined bit error rate of the pulses that are received at the end node of the second light paths. For example, the end node may determine a bit error rate of the received pulses and may feed this information back to the beginning node, so that the spectrum of the chirped pulses can be controlled to minimize the bit error rate.

In another implementation, the end node (or another node of the network) can serve as the remote controller from which instructions are received for controlling the chirped pulses. That is, the end node 304 can send information back to the beginning node, without sending the information to a separate remote controller, and the beginning node can use the information for controlling the chirped pulses to maintain a chromatic dispersion penalty at the end node below a predetermined threshold.

Figure 4:
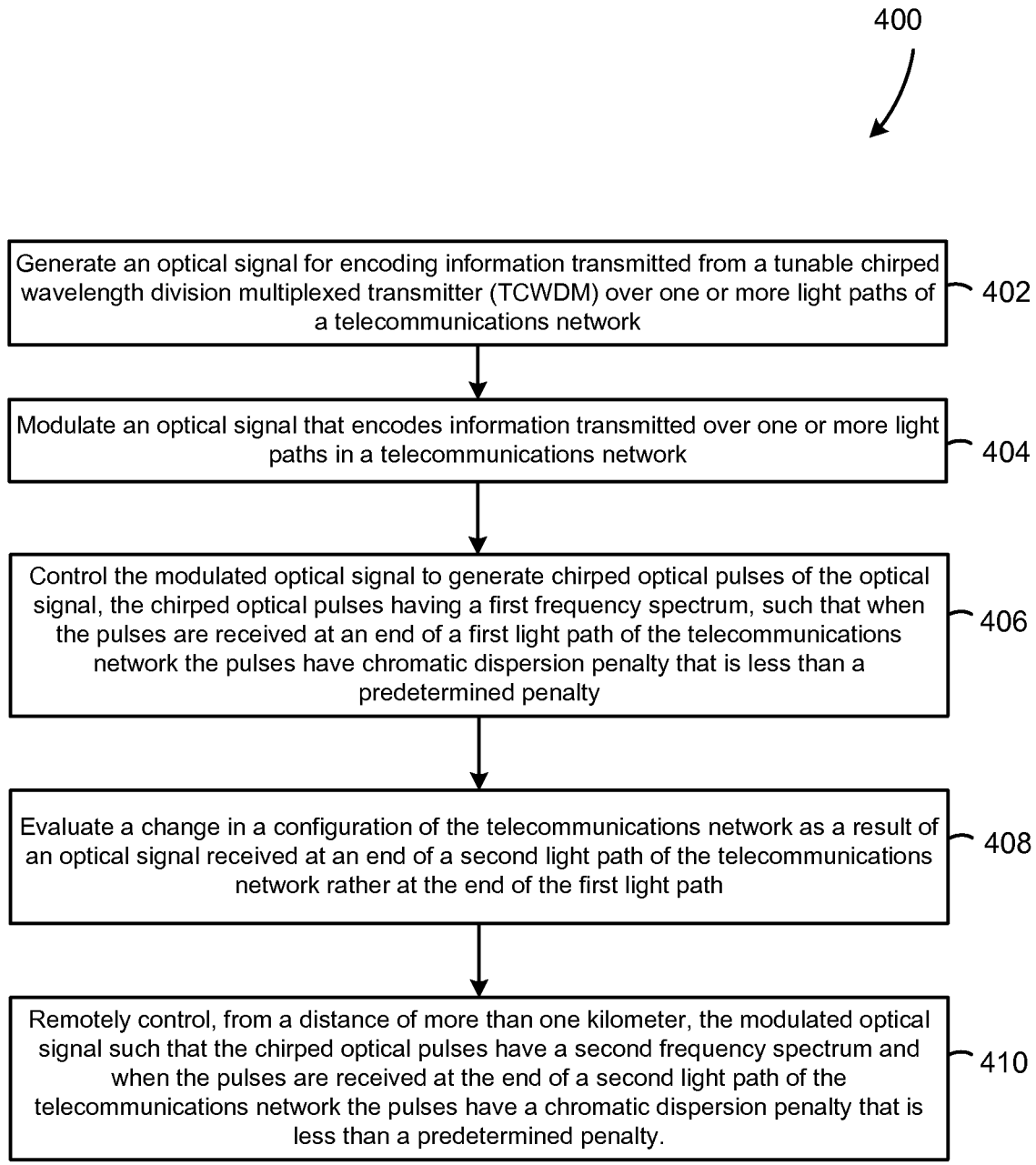
FIG. 4 is a flow chart illustrating a process for reconfiguring a telecommunications network having a TCWDM transmitter.

FIG. 4 is a flow chart illustrating a process 400 for reconfiguring a telecommunications network having a TCWDM transmitter. In a first step (402), an optical signal is generated, where the optical signal is a signal for encoding information transmitted from a tunable chirped wavelength division multiplexed transmitter (TCWDM) over one or more light paths of a telecommunications network. An optical signal that encodes information transmitted over one or more light paths in a telecommunications network (404). The modulated optical signal is controlled to generate chirped optical pulses of the optical signal, where the chirped optical pulses have a first frequency spectrum, and such that when the pulses are received at an end of a first light path of the telecommunications network the pulses have a chromatic dispersion penalty that is less than a predetermined penalty (406). A change in a configuration of the telecommunications network is evaluated as a result of the optical signal received at an end of a second light path of the telecommunications network rather at the end of the first light path (408). Then, the modulated optical signal is remotely controlled, from a distance of more than one kilometer, such that the chirped optical pulses have a second frequency spectrum and when the pulses are received at the end of a second light path of the telecommunications network the pulses have a chromatic dispersion penalty that is less than a predetermined penalty.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art.

What is claimed is:

1. An apparatus for transmitting signals in a telecommunications network, the apparatus comprising:
    a light source configured for generating an optical signal for encoding information transmitted from the apparatus over one or more light paths of the telecommunications network;
    a modulator operably coupled to the light source and configured for controlling the optical signal to generate chirped optical pulses of the optical signal, the chirped optical pulses having a first frequency spectrum and a first temporal pulse envelope, both the first frequency spectrum and the first temporal pulse envelope are controlled by the modulator, such that when the pulses are transmitted from the apparatus and received at an end of the first light path the pulses have a chromatic dispersion penalty that is less than a predetermined penalty for the first light path; and
    modulation control circuitry configured for receiving instructions from a remote controller and, in response to the instructions, controlling the modulator such that the chirped optical pulses have a second frequency spectrum and a second temporal pulse envelope, both the second frequency spectrum and the second temporal pulse envelope are controlled by the modulator, such that when the pulses are transmitted from the apparatus and received at an end of a second light path of the telecommunications network the pulses have a chromatic dispersion penalty that is less than a predetermined penalty for the second light path.

2. The apparatus of claim 1, wherein the modulator is external to the light source and is configured to receive the optical signal from the light source and to output the chirped optical pulses.

3. The apparatus of claim 1, wherein the modulator is configured to modulate the generation of the optical signal by the light source to produce the chirped optical pulses.

4. The apparatus of claim 1,
    wherein the light source is configured to generate a plurality of different optical signals having different wavelengths,
    wherein the modulator is configured to control the different optical signal to generate chirped optical pulses of the different optical signals, the chirped optical pulses of the different optical signals having different first frequency spectra controlled by the modulator, such that when the pulses are received at an end of the first light path the pulses of the different optical signals have a chromatic dispersion penalty that is less than a predetermined penalty,
    and wherein the modulation control circuitry is configured for receiving instructions from a remote controller and, in response to the instructions, controlling the modulator such that the chirped optical pulses of the different optical signals have different second frequency spectra controlled by the modulator, such that when the pulses having the second frequency spectra are received at an end of a second light path of the telecommunications network the pulses have a chromatic dispersion penalty that is less than a predetermined penalty.

5. The apparatus of claim 1, wherein the instructions are based on a determination of a length of the second light path.

6. The apparatus of claim 1, wherein the instructions are based on a determined chromatic dispersion penalty of the pulses that are received at the end of the second light path.

7. The apparatus of claim 1, wherein the first light path and the second light path are each longer than 10 kilometers.

8. A system comprising: a tunable chirped wavelength division multiplexed transmitter (TCWDM), the TCWDM including:
    a light source configured for generating an optical signal for encoding information transmitted from the TCWDM over one or more light paths of a telecommunications network;
    a modulator operably coupled to the light source and configured for controlling the optical signal to generate chirped optical pulses of the optical signal, the chirped optical pulses having a first frequency spectrum and a first temporal pulse envelope, both the first frequency spectrum and the first temporal pulse envelope are controlled by the modulator, such that when the pulses are transmitted from the TCWDM and received at an end of the first light path the pulses have a chromatic dispersion penalty that is less than a predetermined penalty for the first light path; and
    modulation control circuitry configured for controlling the modulator in response to received instructions, such that the chirped optical pulses have a second frequency spectrum and a second temporal pulse envelope, both the second frequency spectrum and the second temporal pulse envelope are controlled by the modulator and when the pulses are transmitted from the TCWDM and received at an end of a second light path of the telecommunications network the pulses have a chromatic dispersion penalty that is less than a predetermined penalty for the second light path; and
    a central office controller located remotely from the TCWDM, the central office controller including:
    a network configuration evaluation module configured for evaluating a change in a configuration of the telecommunications network as a result of the pulses being transmitted from the TCWDM and received at the end of the second light path rather than transmitted from the TCWDM and received at the end of the first light path; and a TCWDM control module configured for generating the instructions based on the change in the configuration of the telecommunications network and configured for sending the instructions to the TCWDM.

9. The system of claim 8, wherein the central office controller is remotely located more than 1 kilometer from the TCWDM.

10. The system of claim 8, wherein the modulator is external to the light source and is configured to receive the optical signal from the light source and to output the chirped optical pulses.

11. The system of claim 8, wherein the modulator is configured to modulate the generation of the optical signal by the light source to produce the chirped optical pulses.

12. The system of claim 8,
wherein the light source is configured to generate a plurality of different optical signals having different wavelengths,
wherein the modulator is configured to control the different optical signal to generate chirped optical pulses of the different optical signals, the chirped optical pulses of the different optical signals having different first frequency spectra controlled by the modulator, such that when the pulses are received at an end of the first light path the pulses of the different optical signals have a chromatic dispersion penalty that is less than a predetermined penalty,
and wherein the TCWDM control module is configured for generating the instructions that are received by the modulation control circuitry and used for controlling the modulator such that the chirped optical pulses of the different optical signals have different second frequency spectra controlled by the modulator so that when the pulses having the second frequency spectra are received at an end of a second light path of the telecommunications network the pulses have a chromatic dispersion penalty that is less than a predetermined penalty.

13. The system of claim 8, wherein the change in the configuration of the telecommunications network includes a different length of the first and second light paths.

14. The system of claim 8, wherein the change in the configuration of the telecommunications network includes a second light path that induces a different chromatic dispersion penalty of the pulses that are received at the end of the second light path.

15. The system of claim 8, wherein the change in the configuration of the telecommunications network includes a change in a bit error rate in received signals when the pulses are received at the end of the second light path rather than at the end of the first light path.

16. The system of claim 8, wherein the first light path and the second light path are each longer than 10 kilometers.

17. A method comprising:
generating an optical signal for encoding information transmitted from a tunable chirped wavelength division multiplexed transmitter (TCWDM) over one or more light paths of a telecommunications network,
modulating an optical signal that encodes information transmitted over one or more light paths in a telecommunications network;
controlling the modulated optical signal to generate chirped optical pulses of the optical signal, the chirped optical pulses having a first frequency spectrum and a first temporal pulse envelope, such that when the pulses are received at an end of a first light path of the telecommunications network the pulses have a chromatic dispersion penalty that is less than a predetermined penalty for the first light path;
evaluating a change in a configuration of the telecommunications network as a result of the optical signal received at an end of a second light path of the telecommunications network rather at the end of the first light path; and
remotely controlling, from a distance of more than one kilometer, the modulated optical signal such that the chirped optical pulses have a second frequency spectrum and a second temporal pulse envelope, and when the pulses are received at the end of a second light path of the telecommunications network the pulses have a chromatic dispersion penalty that is less than a predetermined penalty for the second light path.

18. The method of claim 17, wherein the change in the configuration of the telecommunications network includes a different length of the first and second light paths.

19. The method of claim 17, wherein the change in the configuration of the telecommunications network includes a second light path that induces a different chromatic dispersion penalty of the pulses that are received at the end of the second light path.

20. The method of claim 17, wherein the change in the configuration of the telecommunications network includes a change in a bit error rate in received signals when the pulses are received at the end of the second light path rather than at the end of the first light path.

* * * * *